United States Patent
Chuang et al.

(10) Patent No.: US 12,444,077 B2
(45) Date of Patent: Oct. 14, 2025

(54) DRIVING ENVIRONMENT MONITORING SYSTEM AND DRIVING ENVIRONMENT MONITORING METHOD THEREOF

(71) Applicant: LITE-ON TECHNOLOGY CORPORATION, Taipei (TW)

(72) Inventors: Chih-Yuan Chuang, Taipei (TW); Hao-Min Chang, Taipei (TW); Jiun-Shiung Chen, Taipei (TW); Kun-Hung Lin, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 7 days.

(21) Appl. No.: 18/743,162

(22) Filed: Jun. 14, 2024

(65) Prior Publication Data

US 2025/0005788 A1 Jan. 2, 2025

Related U.S. Application Data

(60) Provisional application No. 63/523,400, filed on Jun. 27, 2023.

(30) Foreign Application Priority Data

Mar. 28, 2024 (CN) .......................... 202410366216.3

(51) Int. Cl.
*G06T 7/73* (2017.01)
*G06V 10/44* (2022.01)
*G06V 20/58* (2022.01)

(52) U.S. Cl.
CPC ............... *G06T 7/73* (2017.01); *G06V 10/44* (2022.01); *G06V 20/58* (2022.01);
(Continued)

(58) Field of Classification Search
CPC . G06T 2207/30252; G06T 2207/30268; G06T 2207/30261; G06T 7/73;
(Continued)

(56) References Cited

U.S. PATENT DOCUMENTS

10,137,893 B2 * 11/2018 Hanna .................. G06V 20/597
10,486,593 B2 * 11/2019 Ohta ...................... G06T 7/593
(Continued)

*Primary Examiner* — Boubacar Abdou Tchoussou
(74) *Attorney, Agent, or Firm* — WPAT, PC (57) ABSTRACT

A driving environment monitoring system includes a line-of-sight analysis module, an environment analysis module and a processor. The line-of-sight analysis module captures an eye image of a driver; and analyzes the eye image to obtain a plurality of line-of-sight probabilities that a line-of-sight of the eye image is located in a plurality of partitions. The environment analysis module is configured to capture an environment image around the mobile vehicle; and analyze the environment image to obtain a plurality of object probabilities that at least one object of the environment image is located in the partitions. The processor is configured to obtain an integration probability of the line-of-sight probability and the object probability in each partition; obtain a forward direction of the mobile vehicle; and send a reminder signal based on the integration probability of the partition where the forward direction is located being greater than a preset probability.

14 Claims, 10 Drawing Sheets

(52) U.S. Cl.
CPC ............... *G06T 2207/20076* (2013.01); *G06T 2207/30252* (2013.01); *G06T 2207/30268* (2013.01)

(58) Field of Classification Search
CPC .......... G06T 2207/20076; G06V 10/44; G06V 20/58; G06V 20/597
See application file for complete search history.

(56) References Cited

U.S. PATENT DOCUMENTS

| | | | |
|---|---|---|---|
| 10,746,987 B2* | 8/2020 | Lewis ................... | G06V 20/597 |
| 11,423,674 B2* | 8/2022 | Lee ....................... | G06V 20/597 |
| 2021/0339678 A1* | 11/2021 | Kudo ................... | H04N 23/698 |

* cited by examiner

DRIVING ENVIRONMENT MONITORING SYSTEM AND DRIVING ENVIRONMENT MONITORING METHOD THEREOF

This application claims the benefit of U.S. provisional application Ser. No. 63/523,400, filed Jun. 27, 2023, the subject matter of which is incorporated herein by reference, and this application claims the benefit of People's Republic of China application Serial No. 202410366216.3, filed on Mar. 28, 2024, the subject matter of which is incorporated herein by reference.

BACKGROUND OF THE INVENTION

Field of the Invention

The invention relates in general to a driving environment monitoring system and a driving environment monitoring method thereof.

Description of the Related Art

As the number and types of vehicles increase, the probability of traffic accidents also increases year by year. Obviously, in addition to the continuous progress of transportation technology in the power system, the improvement of safety during driving is also another topic. For example, there are many objects on the car's driving route that the driver needs to pay attention to, such as traffic signs, pedestrians, obstacles, etc. The driver needs to pay attention to the road environment as a basis for the next driving action.

In today's society, traffic accidents often occur when the driver does not pay attention to the road conditions. Drivers may not notice traffic signs or obstacles on the road due to fatigue or distraction, and therefore fail to perform correct driving actions according to traffic signs or obstacles in front of them.

SUMMARY OF THE INVENTION

The present invention relates to a driving environment monitoring system and a driving environment monitoring method thereof.

According to an embodiment of the present invention, a driving environment monitoring system, configured to be disposed on a mobile vehicle. The driving environment monitoring system includes a line-of-sight analysis module, an environment analysis module and a processor. The line-of-sight analysis module is configured to capture an eye image of a driver; and analyze the eye image to obtain a plurality of line-of-sight probabilities that a line-of-sight of the eye image is located in a plurality of partitions. The environment analysis module is configured to capture an environment image around the mobile vehicle; and analyze the environment image to obtain a plurality of object probabilities for at least one object of the environment image located in the partitions. The processor is configured to obtain an integration probability of the line-of-sight probability and the object probability in each partition; obtain a forward direction of the mobile vehicle; and send a reminder signal based on the integration probability of the partition where the forward direction is located being greater than a preset probability.

According to another embodiment of the present invention, a driving environment monitoring method includes the following steps: capturing, by a line-of-sight analysis module, an eye image of a driver; analyzing, by the line-of-sight analysis module, the eye image to obtain a plurality of line-of-sight probabilities that a line-of-sight of the eye image is located in a plurality of partitions; capturing, by an environment analysis module, an environment image around a mobile vehicle; analyzing, by the environmental analysis module, the environment image to obtain a plurality of object probabilities for at least one object of the environment image located in the partitions; obtaining, by a processor, an integration probability of the line-of-sight probability and the object probability in each partition; obtaining, by the processor, a forward direction of the mobile vehicle; and sending a reminder signal, by the processor, based on the integration probability of the partition where the forward direction is located being greater than a preset probability.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
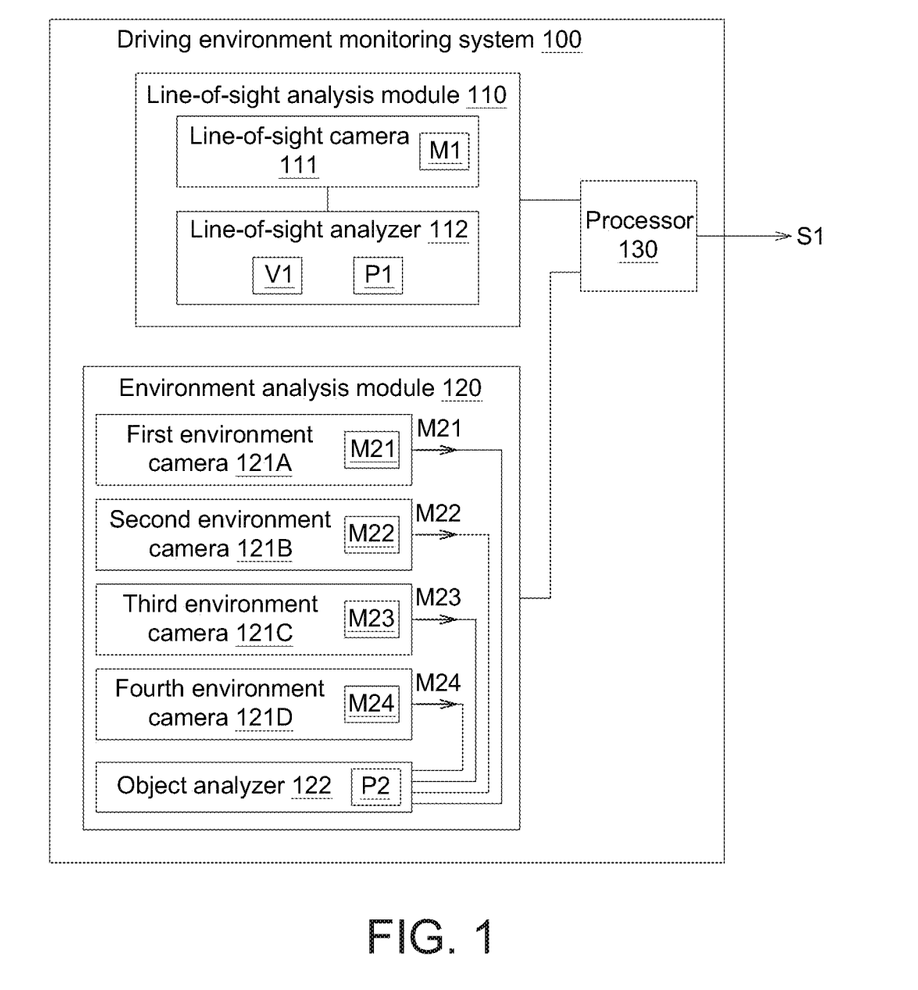
FIG. 1 illustrates a functional block diagram of a driving environment monitoring system according to an embodiment of the present invention.
Figure 2A:
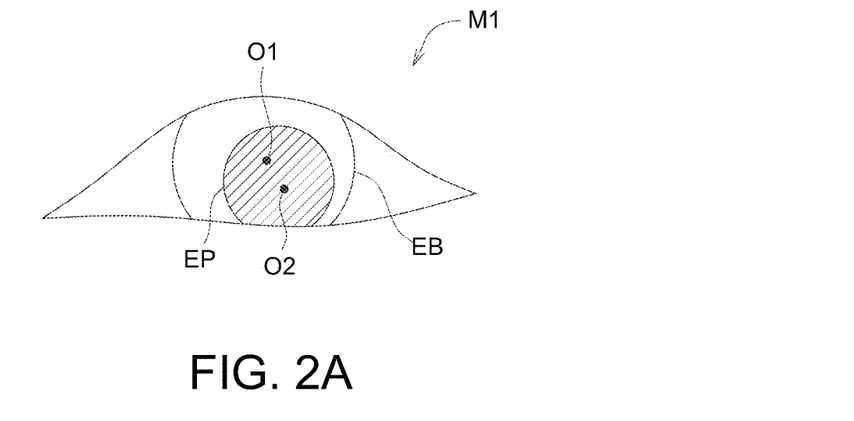
FIG. 2A illustrates a schematic diagram of an eye image of FIG. 1.
Figure 2B:
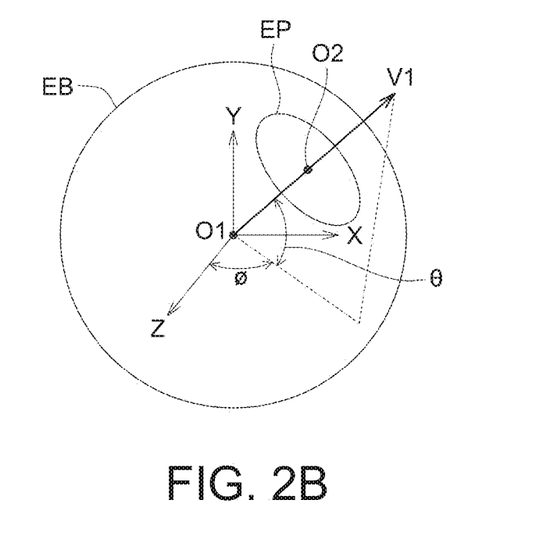
FIG. 2B illustrates a schematic diagram of a line-of-sight of FIG. 1.
Figure 3:
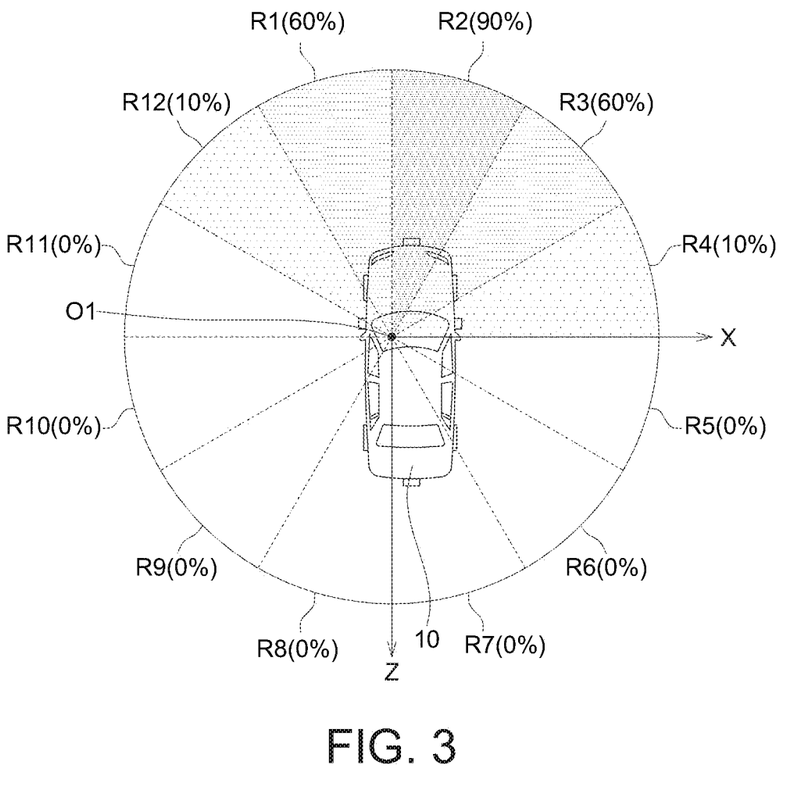
FIG. 3 illustrates a schematic diagram of a line-of-sight probability distribution of a plurality of the partitions according to an embodiment of the present invention.
Figure 4:
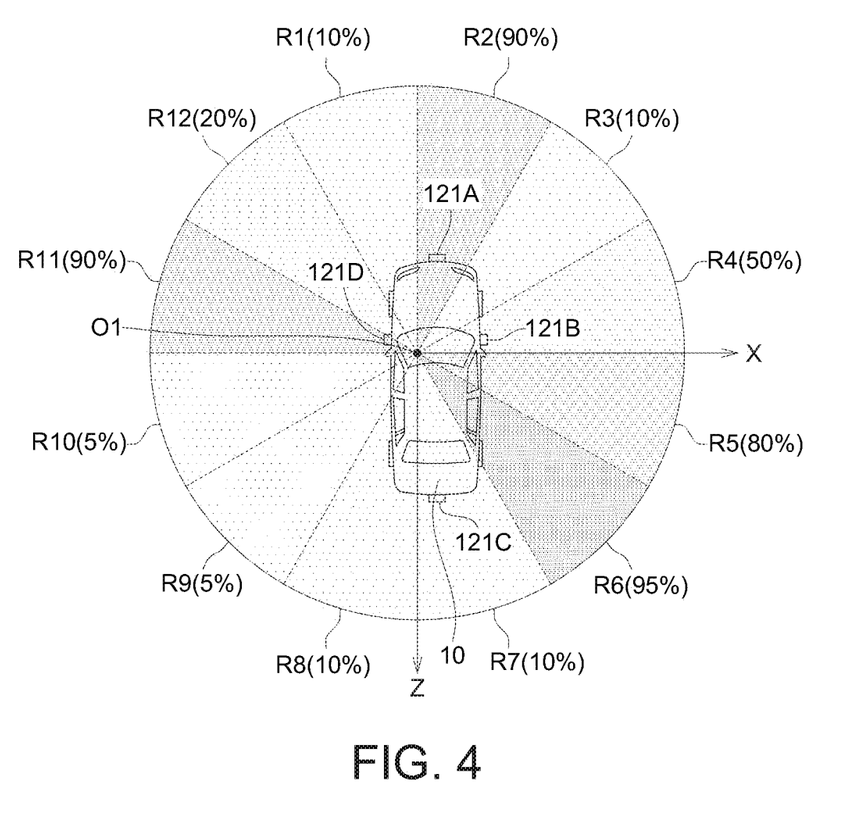
FIG. 4 illustrates a schematic diagram of an object probability distribution of a plurality of the partitions according to an embodiment of the present invention.
Figure 5:
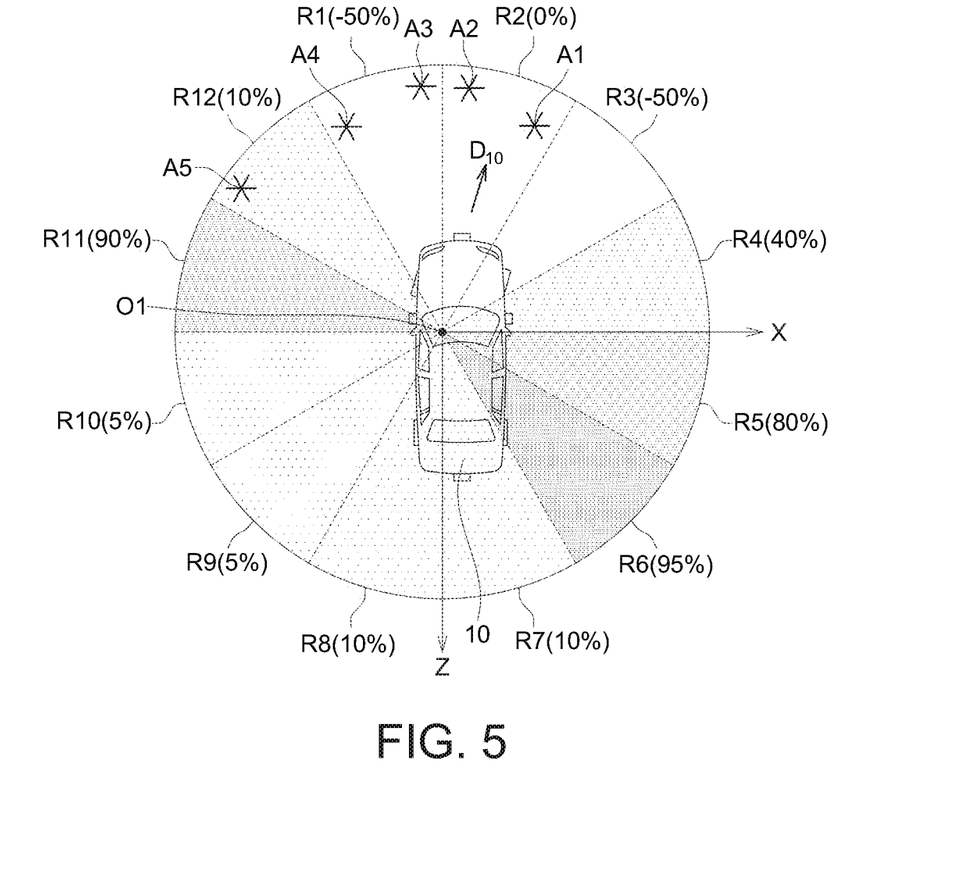
FIG. 5 illustrates a schematic diagram of an integration probability distribution of a plurality of the partitions according to an embodiment of the present invention.

Referring to FIGS. 1 to 5, FIG. 1 illustrates a functional block diagram of a driving environment monitoring system 100 according to an embodiment of the present invention, FIG. 2A illustrates a schematic diagram of an eye image M1 of FIG. 1, FIG. 2B illustrates a schematic diagram of a line-of-sight V1 of FIG. 1, FIG. 3 illustrates a schematic diagram of a line-of-sight probability distribution of a plurality of partitions R1 to R12 according to an embodiment of the present invention, FIG. 4 illustrates a schematic diagram of an object probability distribution of the partitions R1 to R12 according to an embodiment of the present invention, and FIG. 5 illustrates a schematic diagram of an integration probability distribution of a plurality of the partitions R1 to R12 according to an embodiment of the present invention.

As illustrated in FIG. 1, the driving environment monitoring system 100 is disposed on a mobile vehicle 10 and includes a line-of-sight analysis module 110, an environment analysis module 120 and a processor 130. The line-of-sight analysis module 110 is configured to capture the eye image M1 of the driver and analyze the eye image M1 to obtain a plurality of the line-of-sight probabilities that the line-of-sight V1 of the eye image M1 is located in a plurality of the partitions R1 to R12. The environment analysis module 120 is configured to: capture the environment images M21 to M24 around the mobile vehicle 10, and analyze the environment images M21 to M24 to obtain a plurality of object probabilities that a plurality of objects A1 to A5 of the environment images M21 to M24 located in the partitions R1 to R12. The processor 130 is configured to: obtain the integration probability of the line-of-sight probability and the object probability of each partition; obtain a forward direction $D_{10}$ of the mobile vehicle 10; and send a reminder signal S1 based on the integration probability of the partition where the forward direction $D_{10}$ is located being greater than a preset probability. Specifically, when the integration probability of the partition where the forward direction $D_{10}$ of the mobile vehicle 10 is located is greater than the preset probability, it means that there may be objects in the partition, but the line-of-sight V1 is not looking at the partition, so the driving environment monitoring system 100 sends the reminder signal S1 to remind the driver for reducing the incidence of accident.

The reminder signal S1 sent by the processor 130 may, for example, control an indicator (not shown) to send an instruction signal (not shown). The indicator is, for example, a display, a speaker, a vibrator, etc., and the instruction signal is, for example, a corresponding image, sound, vibration, etc. The indicator may be disposed anywhere in the mobile vehicle where the driver may receive the indicator signal. For example, the indicator may be disposed on a windshield, an instrument panel, a steering wheel or other components.

In addition, the number of the environment images depends on the actual situation and is not limited in the embodiment of the present invention. Although the number of partitions in the embodiment of the present invention is 12, it is not intended to limit the embodiment of the present invention. In other embodiment, the number of partitions may also be less than or more than 12.

In an embodiment, the line-of-sight analysis module 110 is, for example, at least a part of a driver monitoring system (DMS). The driver monitoring system includes, for example, a camera module disposed in the mobile vehicle 10 close to a driver's position to capture the images of the driver. The driver monitoring system further includes, for example, a sound pickup device (such as a microphone), a radar, and at least one sensor, wherein the sound pickup device may execute a speech recognition, and the sensors are, for example, physiological information sensors that may monitor heart rhythm, body temperature, heartbeat, etc. The environment analysis module 120 is, for example, at least part of an around view monitoring system (AVM), which includes, for example, a plurality of fisheye camera disposed at least one outer side of the mobile vehicle 10 to capture surrounding environment images, or includes, for example, a detector configured to sense an external object, wherein the detector is, for example, an ultrasonic sensor, a lidar or a radar sensor, etc. The aforementioned processor 130 is, for example, an integration circuit, such as a semiconductor chip, a semiconductor package, etc., which are formed by using at least one semiconductor process.

For example, as shown in FIG. 3, the line-of-sight probabilities of partitions R1 to R12 are 60%, 90%, 60%, 10%, 0%, 0%, 0%, 0%, 0%, 0%, 0% and 10% respectively. Taking the line-of-sight probability of the partition R2 as 90%, it means that the probability of the line-of-sight V1 of the driver paying attention to the partition R2 is 90%. As illustrated in FIG. 4, the object probabilities in the partitions R1 to R12 is 10%, 90%, 10%, 50%, 80%, 95%, 10%, 10%, 5%, 5%, 90% and 20% respectively. Taking the object probability in partition R2 as 90%, it means that the probability of the object appearing in the partition R2 is 90%. The integration probability is, for example, the result of calculating the line-of-sight probability and the object probability. In an embodiment, the operation is, for example, a difference operation. For example, the processor 130 obtains the difference between the line-of-sight probability and the object probability of each partition, and the difference of the two probabilities is used as the integration probability. As a result, as illustrated in FIG. 5, the integration probabilities in the partitions R1 to R12 are −50%, 0%, −50%, 40%, 80%, 95%, 10%, 10%, 5%, 5%, 90% and 10% respectively. In addition, the aforementioned operations may also be other mathematical operations.

When the object probability in a partition is greater, it means that the probability of objects appearing in this partition is greater; when the line-of-sight probability in a partition is greater, it means that the focus of the line-of-sight in this partition is greater. The above-mentioned integration probability is, for example, the result obtained by using the calculation way of "the line-of-sight probability and the object probability are offset or balanced." As a result, taking the partition R2 as an example, the probability of appearing the object is high to 90%, but the line-of-sight probability is also high to 90%, the integration probability of the object probability and the line-of-sight probability being offset or balanced is 0%. Taking the partition R1 as an example, the probability of appearing the object is low (for example, 10%), but the line-of-sight probability is 60%, the integration probability of the object probability and the line-of-sight probability being offset or balanced is less than 0. Taking the partition R5 as an example, the probability of appearing object is as high to 80%, however, due to the line-of-sight probability is not high (for example, 40%), the integration probability of the object probability and the line-of-sight probability being offset or balanced is still greater than 0% (for example, 40%). If the integration probability of a partition is greater, it means that the probability of an accident in that partition is greater (if the forward direction $D_{10}$ of the mobile vehicle 10 is also located in the same partition).

The line-of-sight probability and object probability in each partition in FIGS. 3 to 5 depend on the actual line-of-sight distribution and the actual object distribution, and they are not limited by the embodiments of the present invention. For example, the partitions R1 to R12 in FIG. 3, the partitions R1 to R12 in FIG. 4 and the partitions R1 to R12 in FIG. 5 are the same in number, central angle and position. Although several partitions in FIGS. 3 to 5 are bounded by a circle, the actual monitoring scope is not limited by the circle illustrated in the figures. In the present embodiment, in the same distribution map, each partition has a central angle, and the sum of these central angles is 360 degrees. The apex (center) of the central angle is, for example, a center point of an eyeball (an origin of a reference coordinate system X-Y-Z in FIG. 2B). In an embodiment, the central angle of each partition is equal, but they may also be different. The value of the central angle of the partition may be determined depending to needs, and the central angle may also be minimized to make the partition close to a continuous distribution. The XZ plane in FIG. 2B is, for example, a top view plane of the mobile vehicle 10 (parallel to the ground), and the Y axis is perpendicular to the XZ plane (for example, perpendicular to the ground). The angle in FIG. 2B is also called the yaw angle which is defined on the XZ plane, and the angle is also called the pitch angle which is the angle between the line-of-sight V1 and the XZ plane. In addition, the number of the objects depends on the actual condition and it is not limited in the embodiment of the present invention. As illustrated in FIG. 2B, the line-of-sight V1 in this article is, for example, the direction from the center O1 of the eyeball EB to the center O2 of the pupil EP.

As illustrated in FIG. 5, if the forward direction $D_{10}$ of the mobile vehicle 10 is located in the partition R2, due to the integration probability of the partition R2 is greater than 0% (for example, preset probability), it means that the line-of-sight is focused on the object, so the driving environment monitoring system 100 does not send the reminder signal to the driver. If the forward direction $D_{10}$ of the mobile vehicle 10 is located in the partition R4, due to the integration probability of the partition R4 is 40% which is greater than 0% (preset probability), it means that the line-of-sight may not be focused on the object, and the driving environment monitoring system 100 sends the reminder signal to remind the driver. The aforementioned preset probability is not limited to 0%, and it may be other values, such as 5%, higher or lower.

As illustrated in FIGS. 1 and 2A, the line-of-sight analysis module 110 may analyze the eyeball EV and the pupil EP of the eye image M1 of the driver according to a line-of-sight determination model P1 to obtain the line-of-sight probability that the driver's line-of-sight V1 is located in each partition. The line-of-sight determination model P1 may be obtained by training multiple known eye images using a machine learning technology (for example, deep learning technology). In addition, the embodiment of the present invention does not limit the capturing technology for the line-of-sight determination model P1. In an embodiment, the eye image M1 is input to the line-of-sight determination model P1, and the line-of-sight determination model P1 outputs the line-of-sight probability in each partition after analyzing the eye image M1.

As illustrated in FIGS. 1 and 3, the line-of-sight analysis module 110 includes a line-of-sight camera 111 and a line-of-sight analyzer 112. The line-of-sight camera 111 may be disposed on the mobile vehicle 10 at a position (for example, on the dashboard) facing the driver's face or eyes to capture the eye image M1 of the driver. The line-of-sight analyzer 112 is, for example, an integration circuit, such as a semiconductor chip, a semiconductor package, etc., which formed by at least one semiconductor process. The line-of-sight analyzer 112 is electrically connected to the line-of-sight camera 111 and is configured to analyze the eye image M1 to obtain a plurality of the line-of-sight probabilities that the line-of-sight V1 of the eye image M1 is located in a plurality of the partitions R1 to R12.

As illustrated in FIGS. 1 and 4, the environment analysis module 120 includes a plurality of environment cameras 121A to 121D and an object analyzer 122. The environment camera is, for example, a wide-angle camera, and its field of view (FoV) is, for example, 140 degrees or more. These environmental cameras 121A to 121D are disposed on a plurality of outer surfaces of the mobile vehicle 10. Each environmental camera 121 is configured to capture the environment images M21 to M24, and each environment image includes at least one corresponding object. The environment images M21 to M24 may form a 360-degree around view. The object analyzer 122 is, for example, an integration circuit, such as a semiconductor chip, a semiconductor package, etc., which is formed by at least one semiconductor process. The object analyzer 122 is configured to analyze at least one object in each environment image and determine that the at least one object in each of at least one environment image is the same object. The object analyzer 122 may determine whether there are objects in each environment image by using the object determination model P2. The objects are, for example, people, animals, vehicles, obstacles, traffic signs and other specific objects in a moving state or a static state. The object determination model P2 may be obtained by training multiple known object images using the machine learning technology (for example, deep learning technology). In addition, the embodiment of the present invention does not limit the capturing technology for the object determination model P2. If there is an object in the environment image, the object analyzer 122 may obtain an object frame of the object in the environment image and obtain at least one characteristic coordinate of the object frame for subsequent dynamic tracking for the object. Further examples are illustrated below.

Figure 6A:
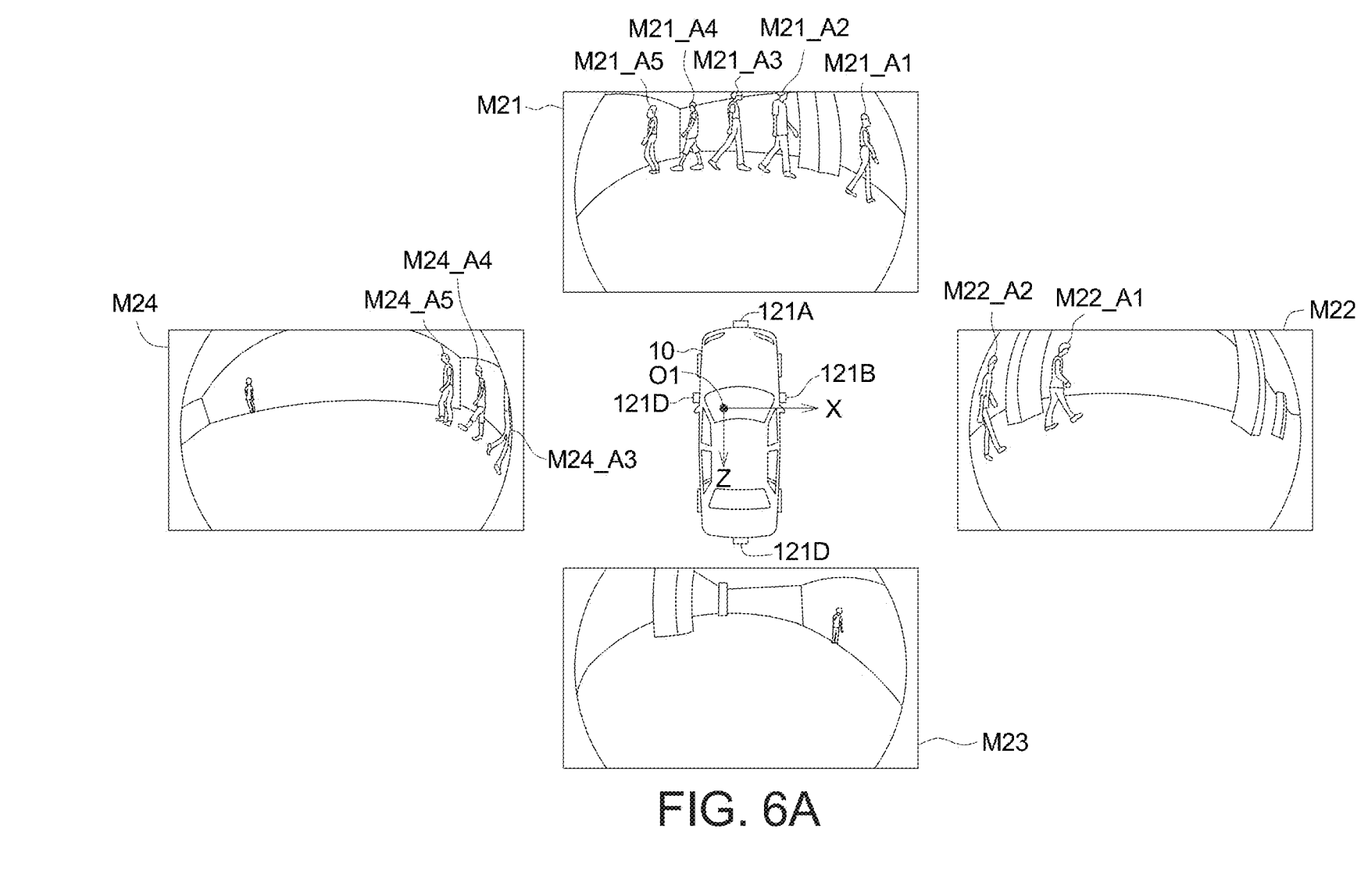
FIG. 6A illustrates a schematic diagram of the environment cameras in FIG. 1 capturing the environment images around the mobile vehicle.
Figure 6B:
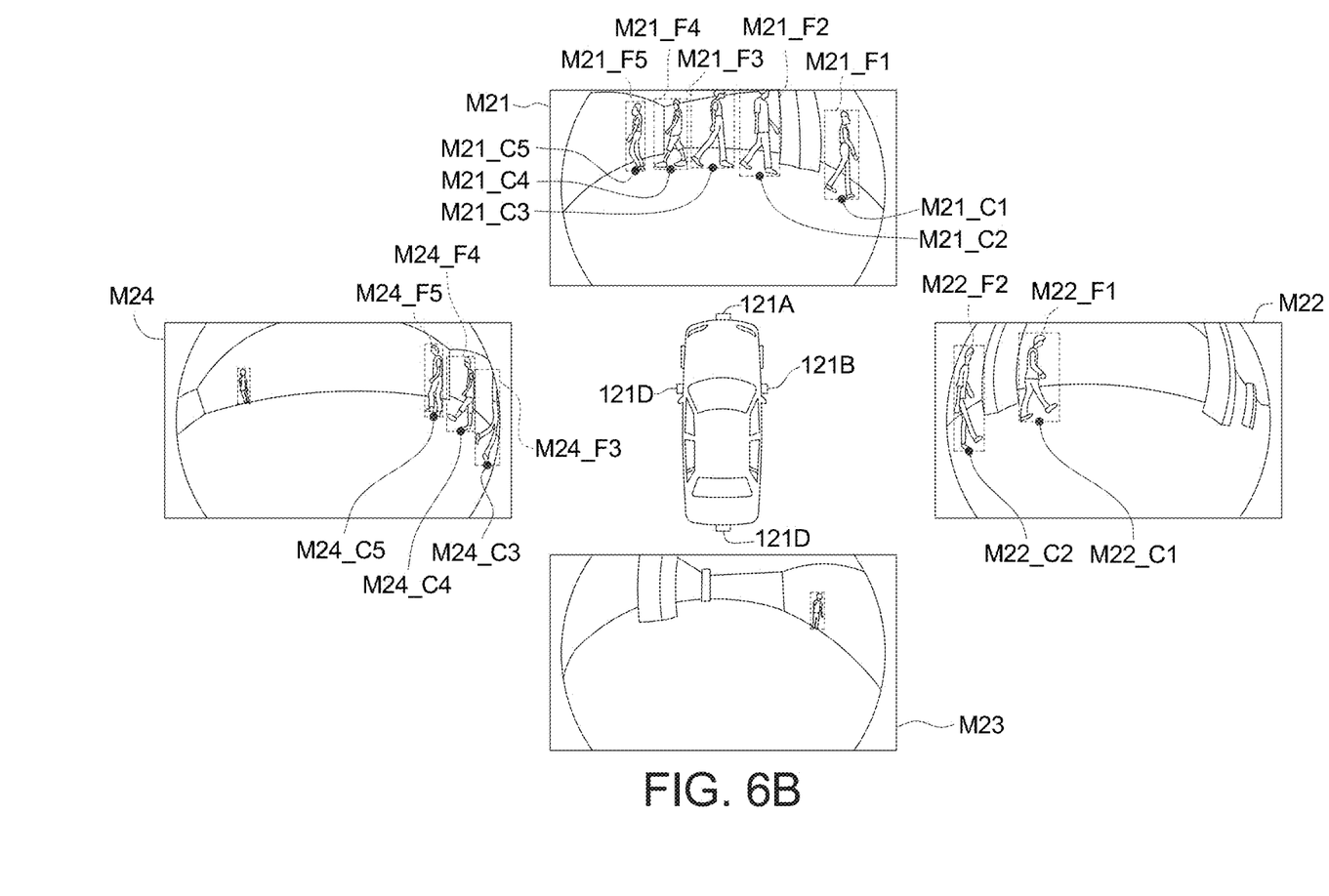
FIG. 6B illustrates a schematic diagram of the object detection of the environment images in FIG. 6A.
Figure 6C:
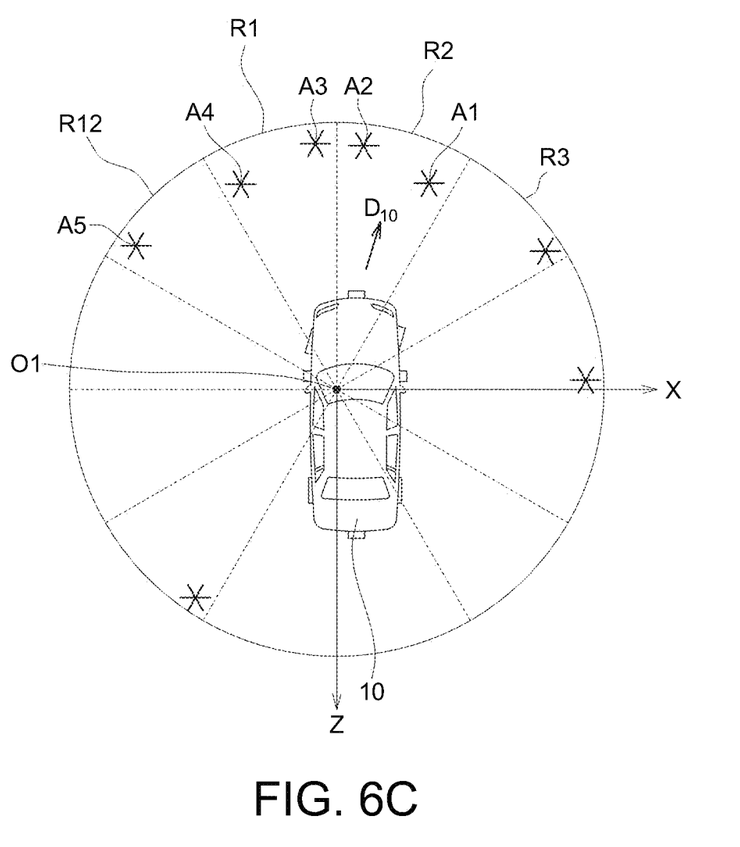
FIG. 6C illustrates a schematic diagram of the objects in the environment images in FIG. 6B mapped to a plurality of the partitions.
Figure 6D:
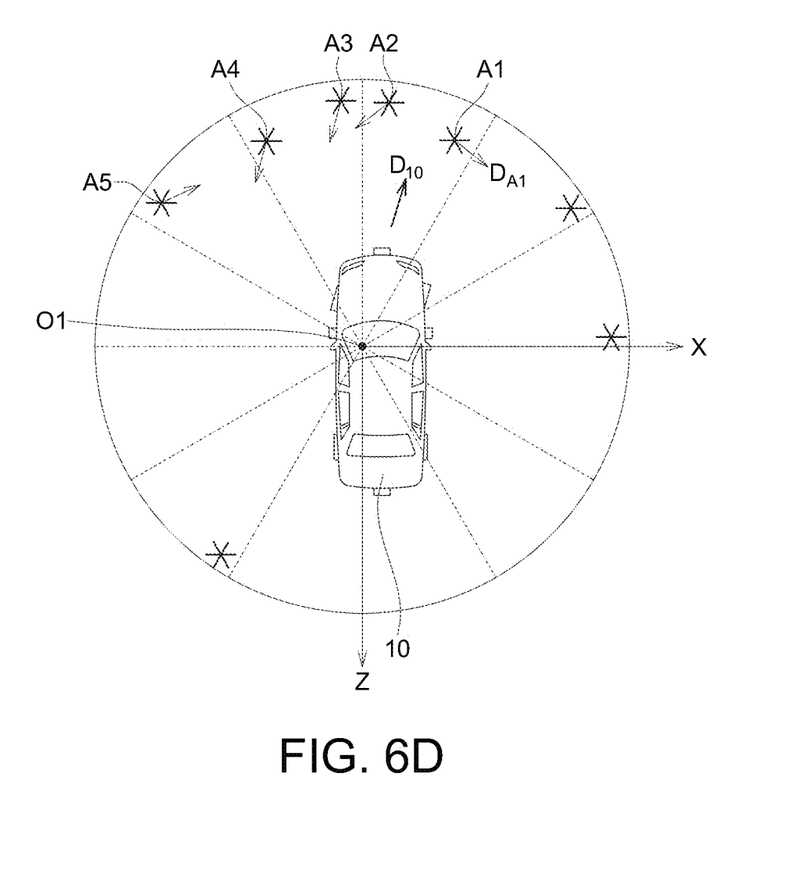
FIG. 6D illustrates a dynamic schematic diagram of the objects in FIG. 6C.

Referring to FIGS. 6A to 6D, FIG. 6A illustrates a schematic diagram of the environment cameras 121A to 121D in FIG. 1 capturing the environment images M21 to M24 around the mobile vehicle 10, FIG. 6B illustrates a schematic diagram of the object detection of the environment images M21 to M24 in FIG. 6A, FIG. 6C illustrates a schematic diagram of the objects in the environment images M21 to M24 in FIG. 6B mapped to a plurality of the partitions R1 to R12, and FIG. 6D illustrates a dynamic schematic diagram of the objects in FIG. 6C.

As illustrates in FIG. 6A, a plurality of the environment cameras 121A to 121D are disposed on a plurality of the outer surfaces of the mobile vehicle 10. For example, a plurality of the environmental cameras 121A to 121D are respectively disposed on a front side, a right side, a rear side and a left side of the mobile vehicle 10 to capture the environment images M21 to M24 respectively. Depending on the actual situation, the environment image may show at least one object or show no object.

There is a partial image overlap area between two of the environment images M21 to M24. In the image overlap area, the two objects in two environment images may be the same object. For example, the environment image M21 has five objects M21_A1 to M21_A5, and the environment image M22 has two objects M22_A1 to M22_A2. The object M21_A1 of the environment image M21 and the object M22_A1 of the environment image M22 belong to the same object, and the object M21_A2 of the environment image M21 and the object M22_A2 of environment image M22 belong to the same object. For another example, the environment image M24 has three objects M24_A3 to M24_A5, wherein the object M24_A3 of the environment image M24 and the object M21_A3 of the environment image M21 belong to the same object, the object M24_A4 of the environment image M24 and the object M21_A3 of the environment image M21 belong to the same object, and the object M24_A5 of the environment image M24 and the object M21_A5 of the environment image M21 belong to the same object.

As shown in FIG. 6B, the object analyzer 122 may determine whether there is an object in the environment image by using the object determination model P2. If the environment image shows such object, the object analyzer 122 may obtain the object probability in each partition using the object determination model P2. In addition, the object probability may accumulate over time. Furthermore, if at least one object appears in a partition at two time periods, the object probability in such partition may be accumulated over time. In addition, the more the number of the object in a partition is, the higher the object probability is.

As shown in FIG. 6B, the environment analysis module 120 is further configured to: analyze the environment image to obtain the object frame of each at least one object in the environment image; and obtain the characteristic coordinate (s) of the object frame. As illustrated in FIG. 6B, taking the environment image M21 as an example, the object analyzer 122 may analyze the environment image M21 to obtain the object frames M21_F1 to M21_F5 of the objects M21_A1 to M21_A5 of the environment image M21; and obtain the characteristic coordinates M21_C1 to M21_C5 of the object frames M21_F1 to M21_F5. Taking the environment image M22 as an example, the object analyzer 122 may analyze the environment image M22 to obtain the object frames M22_F1 to M22_F2 of the objects M22_A1 to M22_A2 of the environment image M22; and obtain the characteristic coordinates M22_C1 to M22_C2 of the object frames M22_F1 to M22_F2. Taking the environment image M24 as an example, the object analyzer 122 may analyze the environment image M24 to obtain the object frames M24_F3 to M24_F5 of the objects M24_A3 to M24_A5 of the environment image M24; and obtain the characteristic coordinates M24_C3 to M24_C5 of the object frames M24_F3 to M24_F5. In an embodiment, the object frame has a bottom edge, and the characteristic coordinate is, for example, the coordinate of a midpoint of the bottom edge. In other embodiments, the characteristic coordinate may be other position point of the object frame, for example, a vertex, any point of an edge (for example, the midpoint), an intersection of two diagonals, a point defined according to at least one edge of the object frame, a point inside the object frame, etc. For example, the characteristic coordinate of each object in each environment image is determined by the same definition.

As illustrated in FIG. 6C, the object analyzer 122 of the environment analysis module 120 is further configured to determine the partition where the characteristic coordinate is located according to the characteristic coordinate.

Taking the object M21_A1 of the environment image M21 and the object M22_A1 of the environment image M22 as an example, the object M21_A1 and the object M22_A1 belong to the same object (designate as the same symbol A1 in FIG. 6C), which are located in the same partition R2. Taking the object M21_A2 of the environment image M21 and the object M22_A2 of the environment image M22 as an example, the object M21_A2 and the object M22_A2 belong to the same objects (designate as the same symbol A2 in FIG. 6C), which are located in the same partition R2. Taking the object M21_A3 of the environment image M21 and the object M22_A3 of the environment image M22 as an example, the object M21_A3 and the object M22_A3 belong to the same object (designate as the same symbol A3 in FIG. 6C), which are located in the same partition R1. Taking the object M21_A4 of the environment image M21 and the object M24_A4 of the environment image M24 as an example, the object M21_A4 and the object M24_A4 belong to the same object (designate as the same symbol A4 in FIG. 6C), which are located in the same partition R1. Taking the object M21_A5 of the environment image M21 and the object M24_A5 of the environment image M24 as an example, the object M21_A5 and the object M24_A5 belong to the same object (designate as the same symbol A5 in FIG. 6C), which are located in the same partition R12.

Each pixel point of each of the environment images M21 to M24 may refer to a reference coordinate system X-Y-Z. That is, each pixel point of each of the environment images M21 to M24 has coordinates referring to the reference coordinate system X-Y-Z. After the environment camera is installed on the mobile vehicle 10, the coordinate value of each pixel point of each of the environment images M21 to M24 relative to the reference coordinate system X-Y-Z may be determined through an actual shooting test and other methods. Therefore, for the same object, its two characteristic coordinates located in two environment images substantially overlap in the same partition. For example, the object frame M21_F1 and the object frame M22_F1 in FIG. 6B belong to the same object A1, so their characteristic coordinates M21_C1 and characteristic coordinates M22_C1 substantially coincide with the point A1 in the partition R2 of FIG. 6C (herein referred to as object A1). The environment analysis module 120 may analyze the dynamics of the object in FIG. 6C, such as a position change, a speed, an acceleration, etc.

As illustrated in FIG. 6D, the environment analysis module 120 is further configured to track a dynamic change of the characteristic coordinate. Taking the object A1 as an example, the object analyzer 122 is configured to: analyze a distance difference between the object M21_A1 in the environment image M21 at two time points, and obtain the speed of the object M21_A1 (for example, along Z-axis, X-axis or two axes) according to the distance difference and the time difference between the two time points; the object analyzer 122 may analyze the distance difference between the object M22_A1 of the environment image M22 at two time points, and obtain the speed of the object M22_A1 according to the distance difference and the time difference between the two time points (For example, along Z-axis, X-axis or two axes); and obtain a synthesis speed (for example, a length of an arrow DA1 in FIG. 6D) of the object A1 and a synthesis direction (for example, a direction of the arrow DA1 in FIG. 6D) of the object A1 according to the speed of the object M21_A1 and the speed of object M22_A1. The object analyzer 122 is further configured to obtain the synthesis speed and the synthesis direction of other objects A2 to A5 using the same method.

Figure 7:
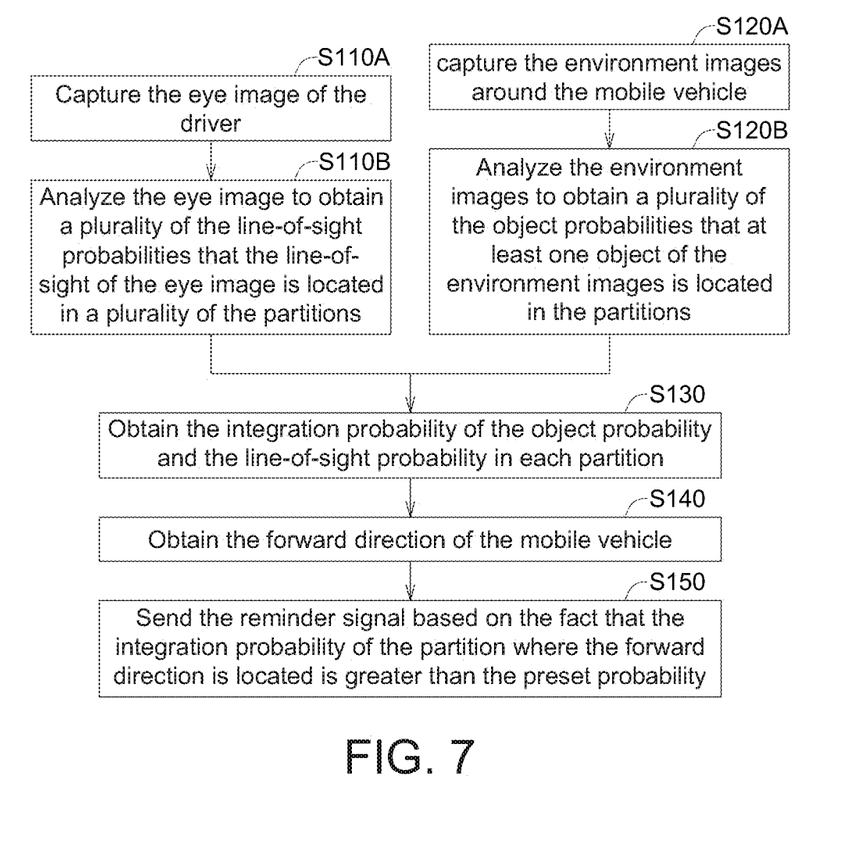
FIG. 7 illustrates a flow chart of the environment monitoring method of the driving environment monitoring system in FIG. 1.

Referring to FIG. 7, FIG. 7 illustrates a flow chart of the environment monitoring method of the driving environment monitoring system 100 in FIG. 1.

In step S110A, as illustrated in FIGS. 1 and 2A, the line-of-sight analysis module 110 captures the eye image M1 of the driver. For example, the line-of-sight camera 111 of the line-of-sight analysis module 110 captures the eye image M1 of the driver, wherein the eye image M1 includes the eyeball EV and the pupil EP.

In step S110B, the line-of-sight analyzer 112 of the line-of-sight analysis module 110 analyzes the eye image M1 to obtain a plurality of the line-of-sight probabilities that the line-of-sight V1 of the eye image M1 is located in a plurality of the partitions R1 to R12. For example, the line-of-sight analyzer 112 analyzes the eyeball EV and the pupil EP of the eye image M1 of the driver according to the line-of-sight determination model P1 to obtain the line-of-sight probability that the driver's line-of-sight V1 is located in each partition, as the line-of-sight probability distribution diagram illustrated in FIG. 3.

In step S120A, the environment cameras 121A to 121D of the environment analysis module 120 capture the environment images M21 to M24 around the mobile vehicle 10.

In step S120B, the object analyzer 122 of the environment analysis module 120 analyzes the environment images M21 to M24 to obtain a plurality of the object probabilities that at least one object of the environment images M21 to M24 is located in the partitions R1 to R12, such as the object probability distribution diagram in FIG. 4.

In step S130, the processor 130 obtains the integration probability of the object probability and the line-of-sight probability of each partition, such as the integration probability distribution diagram in FIG. 5. The integration probability is, for example, the result obtained by using the calculation method of "the object probability and the line-of-sight probability are offset or balanced." The aforementioned operation is, for example, a difference operation.

In step S140, as illustrated in FIG. 6C, the processor 130 obtains the forward direction $D_{10}$ of the mobile vehicle 10. In an embodiment, the forward direction $D_{10}$ may be obtained from a vehicle control computer (not illustrated) of the mobile vehicle 10 or based on a rotation angle of a steering wheel (not illustrated) of the mobile vehicle 10. For example, when the mobile vehicle 10 goes straight (without turning, substantially parallel to –Z-axis of the reference coordinate system X-Y-Z), the angle of the steering wheel is defined as 0 degrees. The processor 130 may obtain the partition where the forward direction $D_{10}$ of the mobile vehicle 10 is located according to the rotation direction (for example, clockwise or counterclockwise) and the rotation angle (relative to the –Z axis) of the steering wheel.

In step S150, the processor 130 sends the reminder signal S1 (the reminder signal S1 is shown in FIG. 1) based on the fact that the integration probability of the partition where the forward direction $D_{10}$ is located is greater than the preset probability. For example, taking the preset probability as 0%, when the integration probability of a partition is equal to or less than 0%, it means that the objects are shown in the partition and the line-of-sight V1 also pays attention to the partition. In another example, there are no objects in the partition and the line-of-sight V1 may pay attention to the partition or not pay attention to such partition, and such partition belongs to a relatively safe partition. Therefore, if the forward direction $D_{10}$ of the mobile vehicle 10 is also located in this relatively safe partition, the processor 130 does not send out the reminder signal. On the contrary, when the integration probability of a partition is greater than 0%, it means that there may be the object in the partition but the line-of-sight V1 does not pay attention to such partition or the degree of attention is low so such partition belongs to a relatively dangerous partition. Therefore, if the forward direction $D_{10}$ of the mobile vehicle 10 is also located in this relatively dangerous partition, the processor 130 sends the reminder signal S1 to notice the driver for safety.

The other steps of the environment monitoring method according to the embodiment of the present invention have been described above and they will not be repeated here.

In summary, embodiments of the present invention propose a driving environment monitoring system and a driving environment monitoring method thereof, which may at least detect the object probabilities that at least one object in an environment image is distributed in a plurality of the partitions and the line-of-sight probabilities that the line-of-sight of the driver is distributed in a plurality of the partitions. The system performs a calculation on the object probabilities and line-of-sight probabilities to obtain a balanced integration probability. In an embodiment, the driving environment monitoring system may send the warning signal when the integration probability is equal to or greater than the preset probability. The driving environment monitoring system may not send the warning signal when the integration probability is less than the preset probability.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A driving environment monitoring system, configured to be disposed on a mobile vehicle, and comprising:
   a line-of-sight analysis module configured to:
      capture an eye image of a driver; and
      analyze the eye image to obtain a plurality of line-of-sight probabilities that a line-of-sight of the eye image is located in a plurality of partitions;
   an environment analysis module configured to:
      capture an environment image around the mobile vehicle; and
      analyze the environment image to obtain a plurality of object probabilities for at least one object of the environment image located in the partitions; and
   a processor configured to:
      obtain an integration probability of the line-of-sight probability and the object probability in each partition;
      obtain a forward direction of the mobile vehicle; and
      send a reminder signal based on the integration probability of the partition where the forward direction is located being greater than a preset probability.

2. The driving environment monitoring system according to claim 1, wherein the processor is further configured to:
   obtain a difference between the object probability and the line-of-sight probability in each partition, and use the difference as the integration probability.

3. The driving environment monitoring system according to claim 1, wherein the environment analysis module is further configured to:
   analyze the environment image to obtain an object frame of each of at least one object of the environment image;
   obtain a characteristic coordinate of the object frame; and
   determine the partition where the characteristic coordinate is located according to the characteristic coordinate.

4. The driving environment monitoring system according to claim 3, wherein the object frame has a bottom edge, and the characteristic coordinate is the coordinate of a midpoint of the bottom edge.

5. The driving environment monitoring system according to claim 1, wherein the environment analysis module comprises:
   a plurality of environmental cameras disposed on a plurality of outer surfaces of the mobile vehicle, wherein each environmental camera is configured to capture the environment image, and each environment image comprises the corresponding at least one object;
   an object analyzer configured to:
      analyze the at least one object in each environment image to determine that the at least one object in each environment image is the same object.

6. The driving environment monitoring system according to claim 1, wherein each partition has a central angle, and the sum of the central angles is 360 degrees.

7. The driving environment monitoring system according to claim 1, wherein each partition has a central angle, and each central angle is equal.

8. A driving environment monitoring method, comprising:
capturing, by a line-of-sight analysis module, an eye image of a driver;
analyzing, by the line-of-sight analysis module, the eye image to obtain a plurality of line-of-sight probabilities that a line-of-sight of the eye image is located in a plurality of partitions;
capturing, by an environment analysis module, an environment image around a mobile vehicle;
analyzing, by the environmental analysis module, the environment image to obtain a plurality of object probabilities for at least one object of the environment image located in the partitions;
obtaining, by a processor, an integration probability of the line-of-sight probability and the object probability in each partition;
obtaining, by the processor, a forward direction of the mobile vehicle; and
sending a reminder signal, by the processor, based on the integration probability of the partition where the forward direction is located being greater than a preset probability.

9. The driving environment monitoring method according to claim 8, further comprising:
obtaining, by the processor, a difference between the line-of-sight probability and the object probability in each partition, and using the difference as the integration probability.

10. The driving environment monitoring method according to claim 8, further comprising:
analyzing, by the processor, the environment image to obtain an object frame of each of the at least one object of the environment image;
obtaining, by the processor, a characteristic coordinate of the object frame; and
determining, by the processor, the partition where the characteristic coordinate is located according to the characteristic coordinate.

11. The driving environment monitoring method according to claim 10, wherein the object frame has a bottom edge, and the characteristic coordinate is the coordinate of a midpoint of the bottom edge.

12. The driving environment monitoring method according to claim 8, further comprising:
capturing, by the environment analysis module, a plurality of environment images, wherein each environment image comprises the corresponding at least one object;
analyzing, by the environment analysis module, the at least one object in each environment image to determine that the at least one object in each environment image is the same object.

13. The driving environment monitoring method according to claim 8, wherein each partition has a central angle, and the sum of the central angles is 360 degrees.

14. The driving environment monitoring method according to claim 8, wherein each partition has a central angle, and each central angle is equal.

* * * * *